US012679338B2

(12) United States Patent
Oh et al.

(10) Patent No.: US 12,679,338 B2
(45) Date of Patent: Jul. 14, 2026

(54) VEHICLE DRIVING CONTROL METHOD AND VEHICLE CONTROL DEVICE

(71) Applicants: HYUNDAI MOTOR COMPANY, Seoul (KR); KIA CORPORATION, Seoul (KR)

(72) Inventors: Sung Jae Oh, Hwaseong-si (KR); Jun Yong Lee, Seongnam-si (KR); Jin Kyeom Cho, Suwon-si (KR); Sung Ik Jo, Hwaseong-si (KR); Ji Hun Choi, Goyang-si (KR); Seung Eun Yu, Bucheon-si (KR); Sung Ho Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 152 days.

(21) Appl. No.: 18/411,810

(22) Filed: Jan. 12, 2024

(65) Prior Publication Data

US 2025/0074397 A1      Mar. 6, 2025

(30) Foreign Application Priority Data

Sep. 4, 2023      (KR) ........................ 10-2023-0117076

(51) Int. Cl.
*B60W 30/02* (2012.01)
*B60W 10/10* (2012.01)
(Continued)

(52) U.S. Cl.
CPC .......... *B60W 30/025* (2013.01); *B60W 10/10* (2013.01); *B60W 10/18* (2013.01);
(Continued)

(58) Field of Classification Search
CPC .... B60W 30/025; B60W 10/10; B60W 10/18; B60W 30/146; B60W 30/18127;
(Continued)

(56) References Cited

U.S. PATENT DOCUMENTS 6,863,639 B1 *   3/2005   Inoue ...................... F16H 61/16
                                                                        477/116
10,053,088 B1   8/2018   Askeland
                (Continued)

FOREIGN PATENT DOCUMENTS

CN        210126518 U   *   3/2020   ............ B60W 10/10
DE   102007000560 B3      6/2009
                (Continued)

OTHER PUBLICATIONS

CN210126518U—English Translation (Year: 2020).*
(Continued)

*Primary Examiner* — Hitesh Patel
*Assistant Examiner* — David Mesquiti Ovalle
(74) *Attorney, Agent, or Firm* — MCDONNELL BOEHNEN HULBERT & BERGHOFF LLP

(57) ABSTRACT

A vehicle control device and a vehicle driving control method includes determining whether a motion sickness prevention mode is entered, based on road condition information and user-configured information about whether to activate the motion sickness prevention mode, while a vehicle is driving, and controlling, in case that the motion sickness prevention mode is entered, the vehicle by varying driving control factors, which includes at least one of longitudinal limit acceleration, a hydraulic braking amount, a regenerative braking amount, a braking distribution ratio, and a shift gear configured for the vehicle, depending on whether the vehicle accelerates or decelerates in a low-speed (Continued)

driving situation where the vehicle's speed is equal to or lower than a predetermined first reference speed.

14 Claims, 7 Drawing Sheets

(51) Int. Cl.
*B60W 10/18* (2012.01)
*B60W 30/14* (2006.01)
*B60W 30/18* (2012.01)

(52) U.S. Cl.
CPC .... *B60W 30/146* (2013.01); *B60W 30/18127* (2013.01); *B60W 2540/10* (2013.01); *B60W 2540/12* (2013.01); *B60W 2540/22* (2013.01); *B60W 2552/20* (2020.02); *B60W 2720/106* (2013.01)

(58) Field of Classification Search
CPC ......... B60W 2552/20; B60W 2540/10; B60W 2540/12; B60W 2540/22; B60W 2720/106
USPC .......................................................... 701/93
See application file for complete search history.

(56) References Cited

U.S. PATENT DOCUMENTS

| | | | |
|---|---|---|---|
| 10,107,635 B2 | 10/2018 | Larner et al. | |
| 10,259,451 B2 | 4/2019 | Wan et al. | |
| 10,775,788 B2 | 9/2020 | Kim et al. | |
| 11,034,360 B2 | 6/2021 | Wan et al. | |
| 2004/0040765 A1 | 3/2004 | Satou et al. | |
| 2007/0182243 A1 | 8/2007 | Osborn et al. | |
| 2008/0100131 A1* | 5/2008 | Jeon ........................ | B60T 8/266 |
| | | | 303/152 |
| 2017/0259795 A1 | 9/2017 | Das et al. | |
| 2018/0313663 A1 | 11/2018 | Kobayashi | |
| 2018/0334167 A1 | 11/2018 | Drown et al. | |
| 2019/0022347 A1 | 1/2019 | Wan et al. | |
| 2019/0041228 A1 | 2/2019 | Singhal | |
| 2020/0094801 A1* | 3/2020 | Huff ........................ | B60T 8/172 |
| 2020/0114929 A1 | 4/2020 | Wan et al. | |
| 2020/0164879 A1 | 5/2020 | Lee et al. | |
| 2020/0331475 A1* | 10/2020 | Zhang ................... | B60T 8/1755 |
| 2021/0114553 A1* | 4/2021 | Awtar ..................... | B60N 2/04 |
| 2021/0171030 A1 | 6/2021 | Lee et al. | |
| 2021/0179111 A1 | 6/2021 | Kim | |
| 2021/0339759 A1* | 11/2021 | Fouad ................... | G06V 40/161 |
| 2021/0380093 A1* | 12/2021 | Takaso ................. | B60W 10/02 |
| 2021/0402898 A1* | 12/2021 | Alvarez ................ | B60N 2/501 |
| 2022/0315100 A1* | 10/2022 | Shimizu ............. | B60W 50/029 |
| 2022/0348226 A1 | 11/2022 | Bailey et al. | |
| 2023/0242153 A1* | 8/2023 | Donderici ........ | B60W 50/0097 |
| | | | 701/36 |
| 2024/0152153 A1* | 5/2024 | Cho ........................ | G05D 1/695 |

FOREIGN PATENT DOCUMENTS

| | | | | |
|---|---|---|---|---|
| DE | 102019203994 A1 | | 10/2020 | |
| EP | 1476330 B1 | | 1/2006 | |
| JP | 2004-299569 A | | 10/2004 | |
| JP | 2004-299570 A | | 10/2004 | |
| JP | 2006-034576 A | | 2/2006 | |
| JP | 2006-036012 A | | 2/2006 | |
| JP | 2007-161236 A | | 6/2007 | |
| JP | 2007-236644 A | | 9/2007 | |
| JP | 2008-230575 A | | 10/2008 | |
| JP | 4247738 B2 | | 4/2009 | |
| JP | 4882433 B2 | | 2/2012 | |
| JP | 2008008426 A | * | 8/2012 | ............. F16H 61/16 |
| JP | 2018-076027 A | | 5/2018 | |
| JP | 6591085 B2 | | 10/2019 | |
| JP | 2021-084586 A | | 6/2021 | |
| JP | 2023-000407 A | | 1/2023 | |
| KR | 2004-0101233 A | | 12/2004 | |
| KR | 10-0961006 B1 | | 5/2010 | |
| KR | 2017-0064909 A | | 6/2017 | |
| KR | 2018-0033139 A | | 4/2018 | |
| KR | 2018-0067830 A | | 6/2018 | |
| KR | 10-2060303 B1 | | 12/2019 | |
| KR | 2021-0072184 A | | 6/2021 | |
| KR | 2022-0011864 A | | 2/2022 | |
| KR | 2022-0012490 A | | 2/2022 | |
| KR | 2022-0027260 A | | 3/2022 | |
| KR | 2022-0051061 A | | 4/2022 | |
| WO | 2018/070330 A1 | | 4/2019 | |

OTHER PUBLICATIONS

JP2008008426A—English Translation (Year: 2012).*
Hecht, Walter: A method for driving a neutral position of a motor vehicle transmission and for driving a parking device of the motor vehicle, (English), 2009. (Year: 2009).

* cited by examiner

· road condition information
· whether to activate motion
  sickness prevention mode
· APS
· BPS

100 execution determination unit — 110 controller — 120

FIG. 2 vehicle
speed
(kph)

time (s)

---- before control

---·--- degree of acceleration limitation

------- after control is applied

VEHICLE DRIVING CONTROL METHOD AND VEHICLE CONTROL DEVICE

CROSS REFERENCE TO RELATED APPLICATIONS

This application is based on and claims priority under 35 U.S.C. 119 to Korean Patent Application No. 10-2023-0117076, filed on Sep. 4, 2023, in the Korean Intellectual Property Office, the disclosure of which is herein incorporated by reference in its entirety.

BACKGROUND

Technical Field

The present disclosure relates to a vehicle control device and a vehicle driving control method for controlling the driving of a vehicle to reduce motion sickness of a passenger riding in the vehicle.

Background

With the recent advancement of various sensors and recognition systems, driver assistance systems and autonomous driving systems that consider driver convenience and safety can control the driving of a vehicle without a driver's intervention.

However, as the amount of time spent in a vehicle increases, passengers in the vehicle may experience motion sickness when the passengers are in the vehicle for a long time or are in a traffic jam area with repeated stops and starts. Motion sickness may occur due to various causes, and in particular, discomfort due to perceptual disparity between the field of view and longitudinal or lateral acceleration may be the most significant cause of motion sickness.

As described above, in a traffic jam area, the frequent occurrence of acceleration or deceleration of the vehicle causes a sudden change in longitudinal acceleration, thereby causing motion sickness of passengers. However, in the past, attempts were made to prevent motion sickness in passengers by detecting the motion sickness and only controlling a vehicle in the lateral direction or controlling a seat.

Therefore, in order to reduce motion sickness of passengers, it is necessary to develop a method for preventing frequent sudden changes in longitudinal acceleration depending on the driving situation of the vehicle or addressing discomfort due to perceptual disparity between the field of view and longitudinal acceleration.

The foregoing described as the background art is intended merely to aid in the understanding of the background of the present disclosure, and is not intended to mean that the present disclosure falls within the purview of the related art already known to those skilled in the art.

SUMMARY

The present disclosure has been made to solve the above-described problems, and an aspect of the present disclosure is to provide a vehicle control device and a vehicle driving control method for preventing a sudden change in longitudinal acceleration of a vehicle when the vehicle accelerates or decelerates while the vehicle is in motion, especially while the vehicle is driving at a low speed.

The technical subjects pursued in the present disclosure may not be limited to the above-mentioned technical subjects, and other technical subjects which are not mentioned may be clearly understood, through the following descriptions, by those skilled in the art to which the present disclosure pertains.

In view of the foregoing, a vehicle driving control method may include determining whether a motion sickness prevention mode is entered, based on road condition information and user-configured information about whether to activate the motion sickness prevention mode, while a vehicle is driving, and controlling, in case that the motion sickness prevention mode is entered, the vehicle by varying driving control factors, which includes at least one of longitudinal limit acceleration, a hydraulic braking amount, a regenerative braking amount, a braking distribution ratio, and a shift gear configured for the vehicle, depending on whether the vehicle accelerates or decelerates in a low-speed driving situation where the vehicle's speed is equal to or lower than a predetermined first reference speed.

For example, the controlling may include controlling longitudinal acceleration of the vehicle to be limited in case that the vehicle accelerates in the low-speed driving situation, and controlling, in case that the vehicle decelerates, neutral N to be applied when the vehicle's speed reaches a predetermined second reference speed by performing the deceleration through a braking distribution ratio having a large regenerative braking amount compared to a hydraulic braking amount.

For example, the controlling may include controlling the longitudinal acceleration of the vehicle to be limited based on the longitudinal limit acceleration varied during acceleration in the low-speed driving situation in case that an accelerator-pedal position sensor receives an input.

For example, the longitudinal limit acceleration may be varied based on different acceleration change rates depending on at least one of a targeted degree of acceleration of the vehicle and a targeted degree of prevention of a user's motion sickness.

For example, the controlling may include controlling the longitudinal acceleration of the vehicle to be limited based on the longitudinal limit acceleration until the vehicle's speed exceeds the first reference speed in case that the vehicle accelerates in the low-speed driving situation.

For example, the controlling may include determining a deceleration demand torque corresponding to a sensing value of a brake-pedal position sensor in case that the brake-pedal position sensor receives an input in the low-speed driving situation, and controlling the neutral N to be applied when the vehicle's speed reaches the predetermined second reference speed by performing the deceleration through regenerative braking in case that the deceleration demand torque is less than a predetermined reference torque.

For example, the controlling may include controlling, in case that the vehicle decelerates in the low-speed driving situation, the vehicle to decelerate through the regenerative braking while following a preconfigured braking vehicle speed profile for reducing motion sickness.

For example, the controlling of the vehicle to decelerate may include controlling, in case that the vehicle decelerates in the low-speed driving situation, the vehicle to decelerate through the regenerative braking while following the braking vehicle speed profile in consideration of a preconfigured one of multiple regenerative braking detailed setting modes having different regenerative braking reduction amounts depending on vehicle speed.

For example, the controlling of neutral N to be applied may include determining, based on the road condition information, whether a road on which the vehicle is traveling is flat in case that the vehicle's speed reaches the second reference speed while the vehicle decelerates through the regenerative braking, and controlling the neutral N to be applied in case that the road is determined to be flat.

For example, the method may further include, after the controlling, controlling the input of the brake-pedal position sensor to be released in case that the neutral N is applied and the vehicle's speed decelerates to a predetermined third reference speed or lower; and controlling an electronic parking brake to be activated in case that the input of the brake-pedal position sensor is released and the vehicle decelerates to a stop.

Furthermore, in order to achieve the above aspect of the present disclosure, a vehicle control device may include an execution determination unit configured to determine whether a motion sickness prevention mode is entered, based on road condition information and user-configured information about whether to activate the motion sickness prevention mode, while a vehicle is driving, and a controller configured to control, in case that the motion sickness prevention mode is entered, the vehicle by varying driving control factors, which includes at least one of longitudinal limit acceleration, a hydraulic braking amount, a regenerative braking amount, a braking distribution ratio, and a shift gear configured for the vehicle, depending on whether the vehicle accelerates or decelerates in a low-speed driving situation where the vehicle's speed is equal to or lower than a predetermined first reference speed.

For example, the controller may be configured to control longitudinal acceleration of the vehicle to be limited in case that the vehicle accelerates in the low-speed driving situation, and control, in case that the vehicle decelerates, neutral N to be applied when the vehicle's speed reaches a predetermined second reference speed by performing the deceleration through a braking distribution ratio having a large regenerative braking amount compared to a hydraulic braking amount.

For example, the controller may be configured to control the longitudinal acceleration of the vehicle to be limited based on the longitudinal limit acceleration varied during acceleration in the low-speed driving situation in case that an accelerator-pedal position sensor receives an input.

For example, the longitudinal limit acceleration may be varied based on different acceleration change rates depending on at least one of a targeted degree of acceleration of the vehicle and a targeted degree of prevention of a user's motion sickness.

For example, the controller may be configured to control the longitudinal acceleration of the vehicle to be limited based on the varied longitudinal limit acceleration until the vehicle's speed exceeds the first reference speed in case that the vehicle accelerates in the low-speed driving situation.

For example, the controller may be configured to: determine a deceleration demand torque corresponding to a sensing value of a brake-pedal position sensor in case that the brake-pedal position sensor receives an input in the low-speed driving situation; and control the neutral N to be applied when the vehicle's speed reaches the predetermined second reference speed by performing deceleration through regenerative braking in case that the deceleration demand torque is less than a predetermined reference torque.

For example, the controller may be configured to control, in case that the vehicle decelerates in the low-speed driving situation, the vehicle to decelerate through the regenerative braking while following a preconfigured braking vehicle speed profile for reducing motion sickness.

For example, the controller may be configured to control, in case that the vehicle decelerates in the low-speed driving situation, the vehicle to decelerate through the regenerative braking while following the braking vehicle speed profile in consideration of a preconfigured one of multiple regenerative braking detailed setting modes having different regenerative braking reduction amounts depending on vehicle speed.

For example, the controller may be configured to determine, based on the road condition information, whether a road on which the vehicle is traveling is flat in case that the vehicle's speed reaches the second reference speed while the vehicle decelerates through the regenerative braking, and control the neutral N to be applied in case that the road is determined to be flat.

For example, the controller may be configured to control the input of the brake-pedal position sensor to be released in case that the neutral N is applied and thus the vehicle's speed decelerates to a predetermined third reference speed or lower, and control an electronic parking brake to be activated in case that the input of the brake-pedal position sensor is released and the vehicle decelerates to a stop.

According to the above description, the vehicle driving control method and the vehicle control device of the present disclosure may prevent a sudden change in longitudinal acceleration due to acceleration or deceleration of a vehicle by controlling the longitudinal acceleration to be limited when the vehicle accelerates, and by applying neutral N when the vehicle decelerates to a predetermined speed or lower.

Also, by preventing a sudden change in longitudinal acceleration, it is possible to prevent a driver and a passenger in the vehicle from experiencing motion sickness.

Advantageous effects obtainable from the present disclosure may not be limited to the above-mentioned effects, and other effects which are not mentioned may be clearly understood, through the following descriptions, by those skilled in the art to which the present disclosure pertains.

BRIEF DESCRIPTION OF THE FIGURES

The above and other aspects, features and advantages of the present disclosure will be more apparent from the following detailed description taken in conjunction with the accompanying drawings, in which:

FIG. 2 is a graph illustrating an acceleration situation of a vehicle due to operation of a vehicle control device according to an embodiment of the present disclosure.

DETAILED DESCRIPTION

Figure 1:
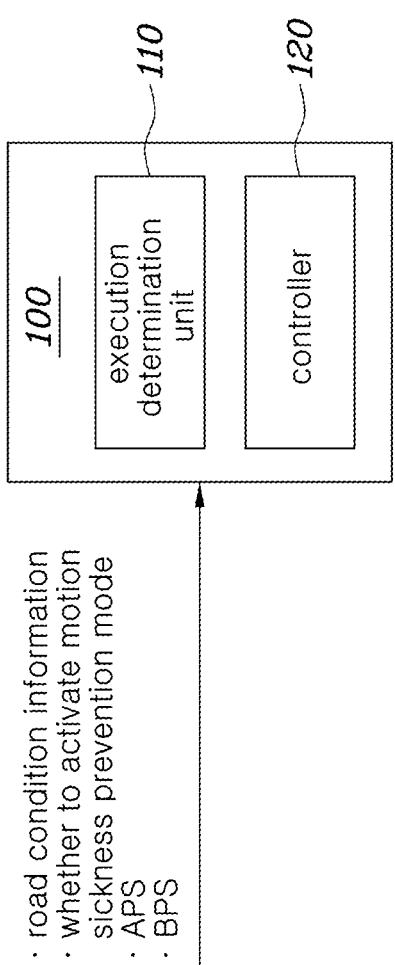
FIG. 1 is a block diagram illustrating the configuration of a vehicle control device according to an embodiment of the present disclosure.

In describing embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Hereinafter, embodiments disclosed in the present specification will be described in detail with reference to the accompanying drawings, and the same or similar elements are given the same and similar reference numerals, so duplicate descriptions thereof will be omitted.

A vehicle control device according to an embodiment of the present disclosure will be described with reference to FIG. 1.

FIG. 1 is a block diagram illustrating the configuration of a vehicle control device according to an embodiment of the present disclosure.

Referring to FIG. 1, a vehicle control device 100 according to an embodiment of the present disclosure may include an execution determination unit 110 and a controller 120. FIG. 1 primarily shows elements related to an embodiment of the present disclosure, and in the actual implementation of the vehicle control device, the vehicle control device may include fewer or more elements than those shown in FIG. 1.

Hereinafter, each element will be described.

The execution determination unit 110 may collect road condition information and user-configured information about whether to activate a motion sickness prevention mode, during driving of a vehicle. The execution determination unit 110 may determine, based on the collected user-configured information, whether the motion sickness prevention mode is entered. The user-configured information may be configured through input from a driver and a passenger during driving of the vehicle, and may refer to information preconfigured in the initial stage. However, this is illustrative and the present disclosure is not necessarily limited thereto. The execution determination unit 110 may determine whether a motion sickness prevention mode is entered and transmit the determination result to the controller 120.

When the execution determination unit 110 determines that the motion sickness mode is entered, the controller 120 may perform control based on the driving situation of the vehicle. The controller 120 according to an embodiment of the present disclosure is configured to control the vehicle's acceleration or deceleration in a low-speed driving situation where the vehicle's speed is equal to or lower than a predetermined first reference speed. For example, the low-speed driving situation may refer to a situation in which the vehicle is traveling at a speed of 30 km/h or less, but is not necessarily limited to the above-described numerical value.

According to an embodiment of the present disclosure, the controller 120 may control the vehicle by varying driving control factors which includes at least one of longitudinal limit acceleration, a hydraulic braking amount, a regenerative braking amount, a braking distribution ratio, and a shift gear, based on whether the vehicle accelerates or decelerates in the low-speed driving situation where the vehicle's speed is equal to or lower than the predetermined first reference speed.

Hereinafter, a detailed description will be made of the controller 120 which controls the vehicle differently depending on whether the vehicle accelerates or decelerates in the low-speed driving situation.

First, the controller 120 may control longitudinal acceleration of the vehicle to be limited when the vehicle accelerates in a low-speed driving situation where the vehicle speed is equal to or lower than a predetermined first reference speed. For example, the controller 120 may receive, from an accelerator-pedal position sensor (APS), information about whether there is an input. When the accelerator-pedal sensor receives an input the controller 120 may determine that the vehicle is accelerates in the low-speed situation.

When the vehicle accelerates in the low-speed situation, the controller 120 may control the longitudinal acceleration of the vehicle to be limited based on a preconfigured longitudinal limit acceleration of the vehicle. Multiple acceleration limitation modes, which have different acceleration change rates depending on at least one of a targeted degree of acceleration of the vehicle and a targeted degree of prevention of a user's motion sickness, may be configured for the vehicle, and a driver and a passenger may select and configure one of the multiple acceleration limitation modes as the motion sickness prevention mode is activated. That is, the preconfigured longitudinal limitation acceleration of the vehicle may be varied depending on the passenger selection.

Accordingly, the controller 120 may determine one acceleration limitation mode configured by the driver and the passenger from among the multiple acceleration limitation modes, and may vary the preconfigured longitudinal limitation acceleration to correspond to the one determined acceleration limitation mode. Then, the controller 120 may control the longitudinal acceleration of the vehicle to be limited based on the varied longitudinal limitation acceleration. An acceleration situation in which the longitudinal acceleration of the vehicle is limited will be described with reference to FIG. 2.

Figure 2:
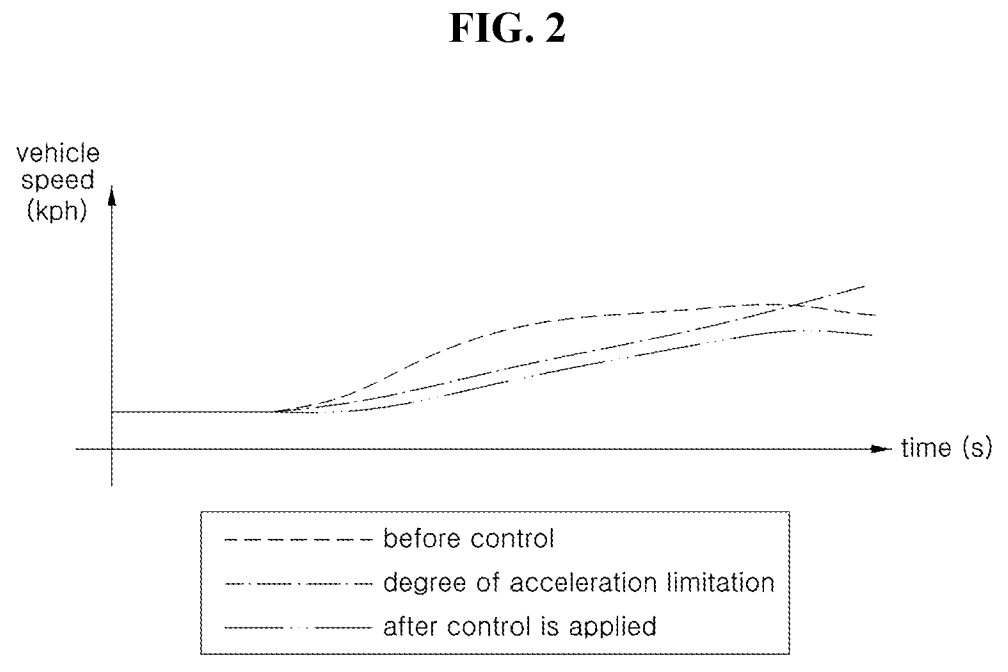

FIG. 2 is a graph illustrating an acceleration situation of a vehicle due to operation of a vehicle control device according to an embodiment of the present disclosure.

Referring to FIG. 2, the graph shows changes in a vehicle's speed over time when accelerating in a low-speed driving situation. When accelerating in a previous low-speed driving situation, the operation of the vehicle control device 100 according to an embodiment of the present disclosure is not performed, and thus it can be observed that a vehicle speed suddenly increases in the initial interval where acceleration is performed, as shown in a dashed line graph shape (before control). On the other hand, due to the operation of the vehicle control device 100 according to an embodiment of the present disclosure, the limitation of the vehicle's acceleration based on varied longitudinal limit acceleration may be configured as shown in a dashed-single dotted line graph. The controller 120 controls, based thereon, longitudinal acceleration to be limited when the vehicle accelerates, whereby the graph of a change in the vehicle's speed over time may appear in the form of a dashed-triple dotted line graph so as not to exceed the dashed-single dotted line graph base on the varied longitudinal limit acceleration.

Therefore, when comparing, in the initial interval where the vehicle accelerates in the low-speed driving situation, the dashed line graph before applying the control operation of the controller 120 according to an embodiment of the present disclosure with the dashed-triple dotted line graph after applying the control operation of the controller 120, it can be observed that the degree of change in the slope of the dashed line graph before applying the control operation is greater than the degree of change in the slope of the dashed-triple dotted line graph after applying the control operation. In the graph of the vehicle speed over time, the slope may imply acceleration, and this may imply that a change in acceleration before the application of the control operation is greater than a change in acceleration after applying the control operation. In other words, the application of the control operation of the controller 120 according to an embodiment of the present disclosure may reduce the change in acceleration of the vehicle, in particular, the change in the longitudinal acceleration, when accelerating in the low-speed driving situation, thereby preventing the driver and the passenger in the vehicle from experiencing motion sickness.

Referring back to FIG. 1, as described above, the controller 120 may control the longitudinal acceleration of the vehicle to be limited when the vehicle accelerates in the low-speed driving situation. However, when the longitudinal acceleration is continuously controlled to be limited, the vehicle may not accelerate when acceleration is required. To this end, the controller 120 according to embodiments of the present disclosure may control the longitudinal acceleration of the vehicle to be limited based on the varied longitudinal limit acceleration until the vehicle's speed exceeds the predetermined first reference speed. That is, when the vehicle's speed exceeds the predetermined first reference speed, the controller 120 may stop controlling the vehicle's longitudinal acceleration to be limited.

Next, when a brake-pedal position sensor (BPS) receives an input in the low-speed driving situation where the vehicle speed is less than a preset first reference speed, the controller 120 may determine that the vehicle decelerates in the low-speed driving situation. To this end, the controller 120 may receive information about the presence or absence of the input from the brake-pedal position sensor in low-speed driving situations of the vehicle. Then, the controller 120 may determine a deceleration demand torque based on a sensing value of the brake-pedal position sensor. The controller 120 may compare the determined deceleration demand torque to a predetermined reference torque to determine whether to perform deceleration-related control in the low-speed driving situation of the vehicle. In this case, the predetermined reference torque may be a value configured to correspond to a reference sensing value (e.g., 50%) of the brake-pedal position sensor. However, this is illustrative and the present disclosure is not necessarily limited thereto.

For example, when the determined deceleration demand torque is greater than or equal to the predetermined reference torque, it may be determined that the driver's willingness to brake in a full-brake situation is strong. Therefore, when the determined deceleration demand torque is greater than or equal to the predetermined reference torque, the controller 120 may switch to a control release state, reflecting the driver's willingness to brake, to prevent the deceleration-related control from being performed in the low-speed driving situation of the vehicle. In this case, in order to inform the driver or the passenger of the deceleration state, the controller 120 may output information about the switching to the control release state.

When the determined deceleration demand torque is less than the predetermined reference torque, the controller 120 may cause the vehicle to decelerate through a higher proportion of regenerative braking compared to hydraulic braking. This will be described with reference to FIG. 3.

Figure 3:
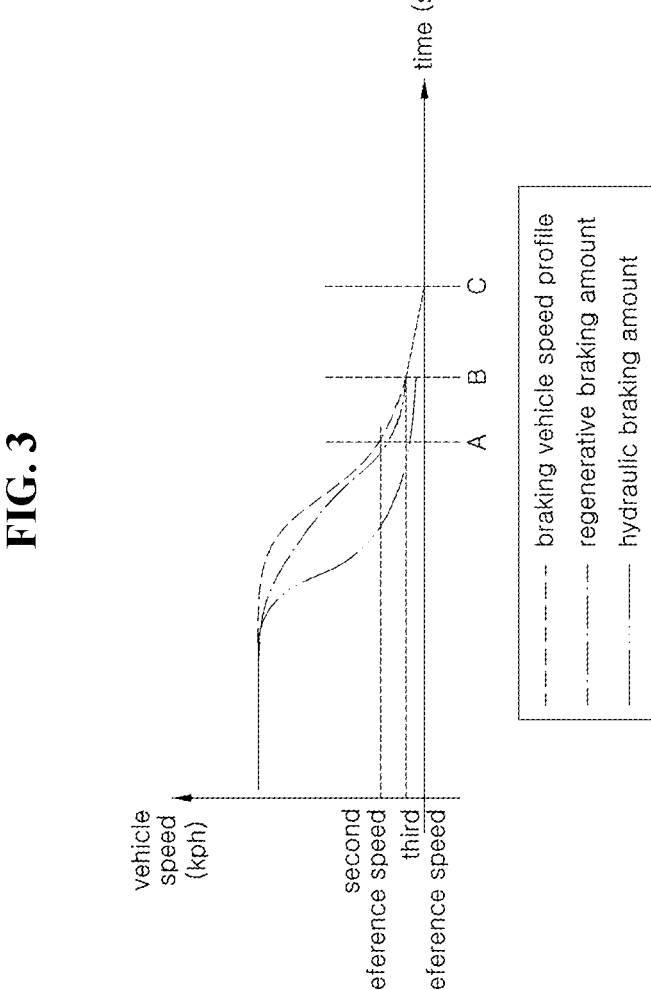
FIG. 3 is a graph illustrating a deceleration situation of a vehicle due to operation of a vehicle control device according to an embodiment of the present disclosure.

FIG. 3 is a graph illustrating a deceleration situation of a vehicle due to operation of a vehicle control device according to an embodiment of the present disclosure.

Referring to FIG. 3, the vehicle may have a preconfigured braking vehicle speed profile for controlling the deceleration of the vehicle in a low-speed driving situation. The braking vehicle speed profile may be configured to reduce motion sickness of a driver or a passenger when the vehicle decelerates in the low-speed driving situation, and may be configured in the form of a dashed line graph representing changes in vehicle speed over time and shown in FIG. 3.

The controller 120 may load or determine the preconfigured braking vehicle speed profile and control the vehicle to decelerate through a braking distribution ratio having a large regenerative braking amount compared to a hydraulic braking amount so as to follow the braking vehicle speed profile. For example, the vehicle may be controlled to decelerate through hydraulic braking and regenerative braking. Therefore, the controller 120 may control the vehicle to decelerate by adjusting the hydraulic braking amount and the regenerative braking amount based on the braking distribution ratio so as to follow the braking vehicle speed profile. In the present disclosure, it is assumed that regenerative braking will be more involved than hydraulic braking in the deceleration of the vehicle by reducing the hydraulic braking amount and increasing the regenerative braking amount. Therefore, when the vehicle decelerated, the controller 120 may control the vehicle to decelerate through hydraulic braking and regenerative braking such that the regenerative braking amount is greater than the hydraulic braking amount, as shown in the graph of FIG. 3, while following the braking vehicle speed profile. However, it should be understood that the regenerative braking amount graph and the hydraulic braking amount graph, shown in FIG. 3, do not have the same physical quantities as the braking vehicle speed profile, but represent only graphical shapes to facilitate the description of changes in the deceleration situation of a vehicle following the braking vehicle speed profile.

When the vehicle decelerates in the low-speed driving situation, the controller 120 may control the vehicle to decelerate while following the braking vehicle speed profile through a high proportion of regenerative braking compared to hydraulic braking, taking into account preconfigured one of multiple regenerative braking detailed setting modes. This will be explained with reference to FIG. 4.

Figure 4:
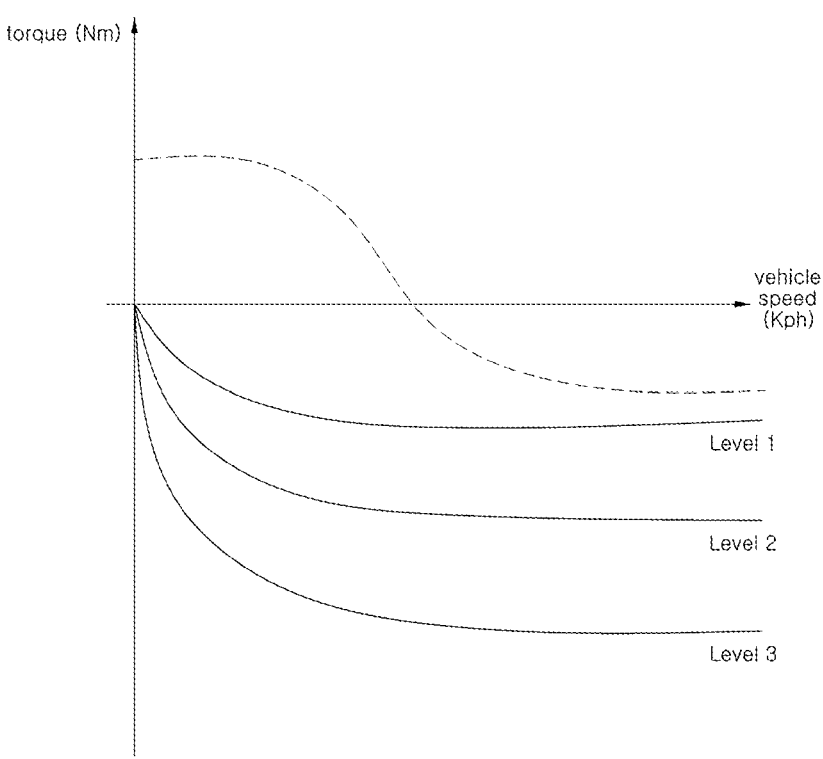
FIG. 4 is a graph illustrating a regenerative braking detailed setting mode that is configured when a vehicle according to an embodiment of the present disclosure decelerates.

FIG. 4 is a graph illustrating a regenerative braking detailed setting mode that is configured when a vehicle according to an embodiment of the present disclosure decelerates.

Referring to FIG. 4, multiple regenerative braking detailed setting modes according to an embodiment of the present disclosure may be configured to have different amounts of regenerative braking reduction depending on a vehicle's speed. For example, the multiple regenerative braking detailed setting modes may be configured in multiple stages with different amounts of regenerative braking reduction.

Conventionally, as shown in the dashed line graph, a regenerative braking torque profile is configured such that torque for regenerative braking decreases as the vehicle speed decreases and below a certain vehicle speed, the torque increases for creep driving of the vehicle. However, an aspect of the present disclosure is to cause the vehicle to stop rather to creep when the vehicle decelerates in the low-speed driving situation, and thus the multiple regenerative braking detailed setting modes may each be configured to decrease the regenerative braking torque as the vehicle speed decreases, ensuring that the regenerative braking torque reaches 0 Nm when the vehicle speed reaches 0 km/h.

With the multiple regenerative braking detailed setting modes configured, the driver may configure one of the multiple regenerative braking detailed setting modes by manipulating a predetermined manipulation device, such as steering or a paddle shift disposed on a steering column. In addition, the driver and the passenger, may configure one of the multiple regenerative braking detailed setting modes by using a display device provided in the vehicle.

Referring again to FIG. 3, the controller 120 may control the vehicle to decelerate through a braking distribution ratio having a large regenerative braking amount compared to a hydraulic braking amount, and then control neutral N to be applied when the vehicle's speed reaches a predetermined second reference speed (at time point A). In this case, the predetermined second reference speed may be 10 km/h. However, this is illustrative, and the present disclosure is not necessarily limited thereto.

However, when neutral N is applied, power is cut off, and thus driving safety may be reduced when the vehicle is not traveling on a flat ground. Therefore, when the vehicle's speed reaches the predetermined second reference speed, the controller 120 may determine, based on road condition information, whether a road on which the vehicle is traveling on is flat. Only when it is determined that the road on which the vehicle is traveling is flat, the controller 120 may control neutral N to be applied.

The controller 120 may control the vehicle to decelerate until the vehicle's speed decelerates to a predetermined third reference speed or lower (from time point A to time point B) while neutral N is applied. For example, the predetermined third reference speed may be 3 km/h. However, this is illustrative and the present disclosure is not necessarily limited thereto. The controller 120 may control the input of the brake-pedal position sensor to be released when the vehicle's speed decelerates to the predetermined third reference speed or lower after neural N is applied (at time point B). Releasing the input of the brake-pedal position sensor may imply ignoring a sensing value input in a situation where the vehicle's deceleration is controlled based on a previous sensing value that has been input through the brake-pedal position sensor. Thus, the controller 120 may control the input of the brake-pedal position sensor to be released so that the vehicle can decelerate itself through coasting at or below the predetermined third reference speed (from time point B to time point C).

When the vehicle decelerates itself through coasting and then comes to a complete stop (at time point C), the controller 120 may control an electronic parking brake (EPB) to be activated. The controller 120 may control the electronic parking brake to be activated, thereby bringing the vehicle to a complete stop. This may prevent the driver and the passenger in the vehicle from experiencing motion sickness when the vehicle decelerates in the low-speed driving situation. The resulting effect will be described with reference to FIG. 5A and FIG. 5B.

Figure 5A:
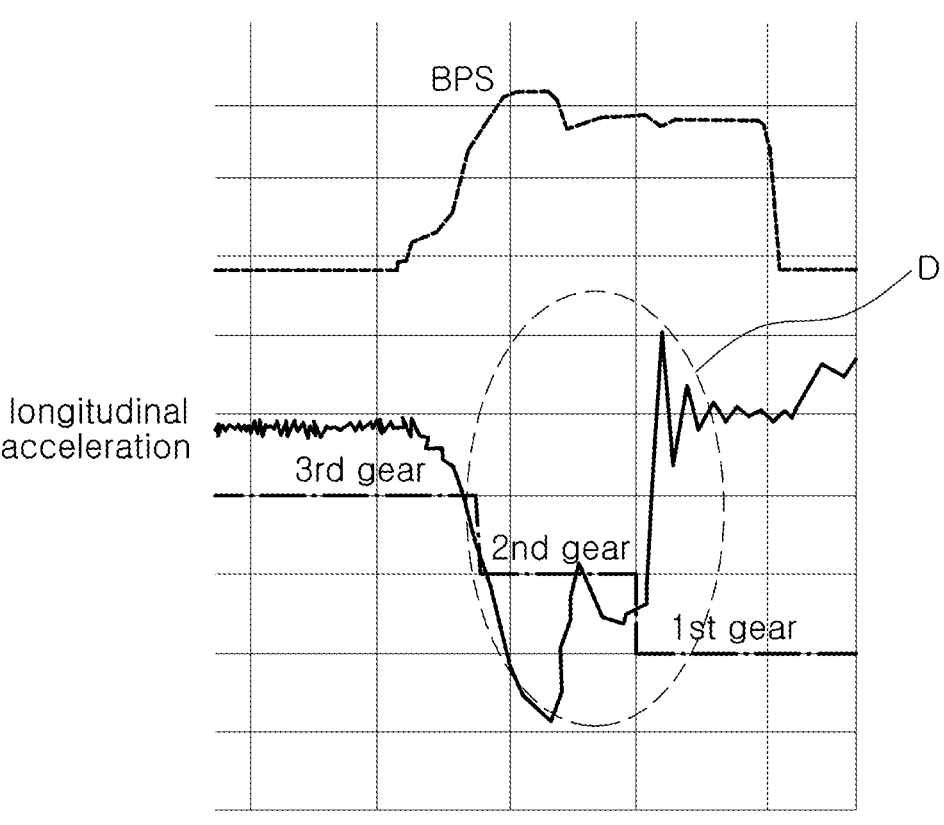
FIG. 5A and FIG. 5B are graphs illustrating the effects of the operation of a vehicle control device according to an embodiment of the present disclosure.
Figure 5B:
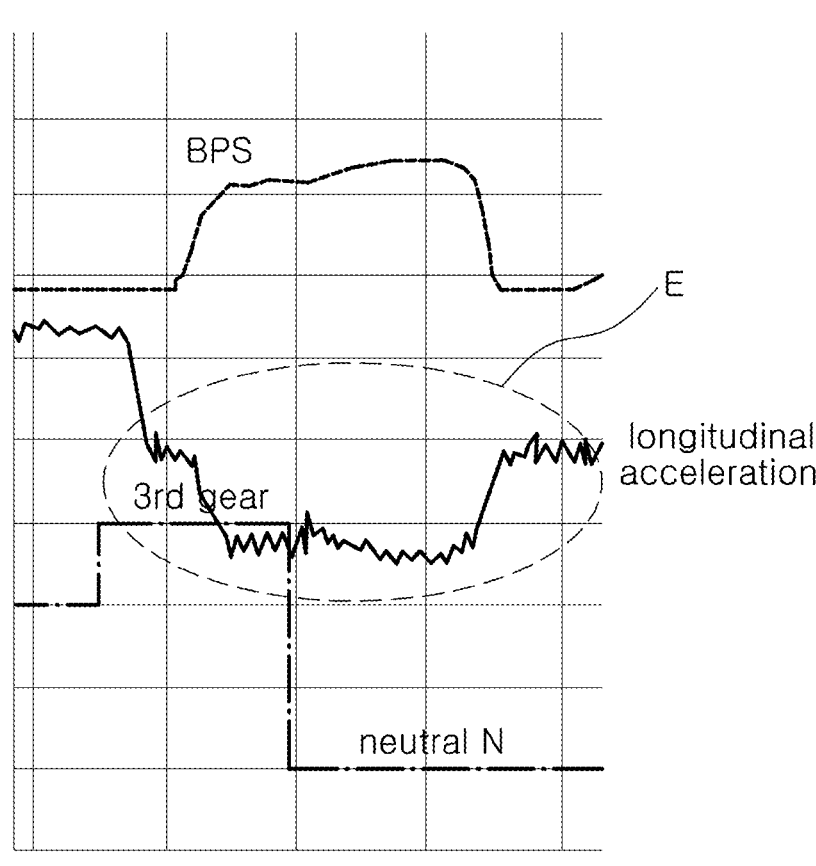

FIG. 5A and FIG. 5B are graphs illustrating the effects of the operation of a vehicle control device according to an embodiment of the present disclosure.

FIG. 5A is a graph showing a change in each physical quantity in a previous vehicle deceleration situation where the operation of the vehicle control device 100 according to an embodiment of the present disclosure is not performed. Referring to FIG. 5A, in the past, when a brake-pedal position sensor (BPS) receives an input, a vehicle was controlled to decelerate by sequentially downshifting a transmission from 3rd gear to 2nd gear and then from 2nd gear to 1st gear. Referring to section D, it can be observed that the longitudinal acceleration of the vehicle decreases rapidly at the moment of shifting from 3rd gear to 2nd gear, and then increases rapidly again at the moment of shifting from 2nd gear to 1st gear. In other words, in the past, the vehicle was controlled to decelerate by sequentially shifting gears in the transmission. However, this led to a significant change in longitudinal acceleration of the vehicle at the moment of gear shifting, and thus a driver and a passenger experienced motion sickness due to discomfort.

On the other hand, FIG. 5B is a graph showing a change in each physical quantity in vehicle deceleration situation through the vehicle control device 100 according to an embodiment of the present disclosure. Referring to FIG. 5B, when the brake-pedal position sensor (BPS) receives an input, the vehicle control device 100 according to an embodiment of the present disclosure shifts immediately the transmission from 3rd gear neutral N, thereby decelerating the vehicle. Referring to section E, it can be observed that a change in longitudinal acceleration occurs at the moment of shifting from 3rd gear to neutral N, but a smaller degree of change in longitudinal acceleration occurs compared to section D in FIG. 5A.

In other words, when the vehicle decelerates in a low-speed driving mode due to the operation of the vehicle control device 100 according to an embodiment of the present disclosure, neutral N may be applied to reduce the change in longitudinal acceleration, so that the driver and the passenger feel less discomfort and is thus prevented from experiencing motion sickness.

Hereinafter, based on the configuration of the vehicle control device 100 described above with reference to FIG. 1, a vehicle driving control method according to an embodiment of the present disclosure will be described with reference to FIG. 6.

Figure 6:
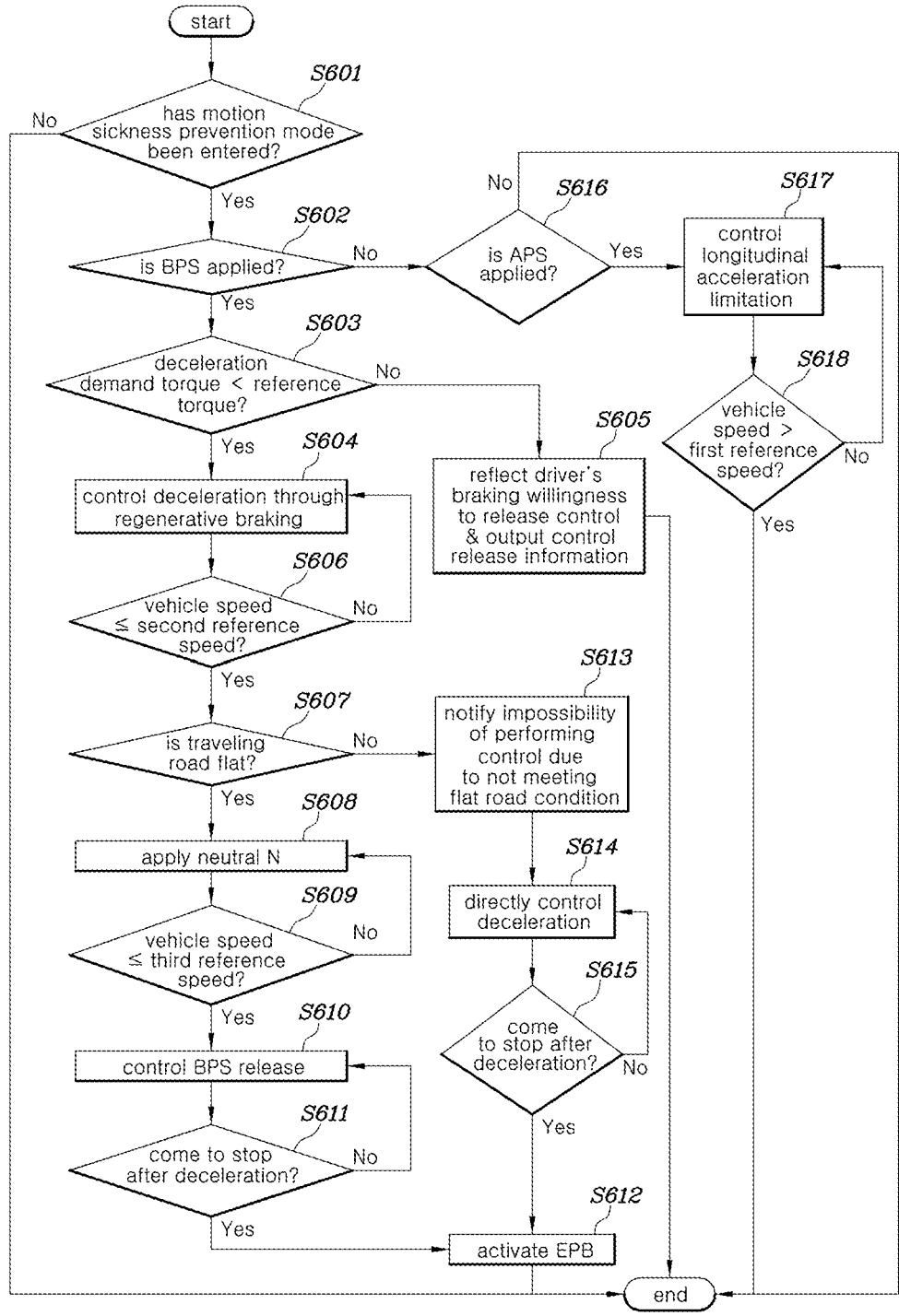
FIG. 6 is a flowchart illustrating a vehicle driving control method according to an embodiment of the present disclosure.

FIG. 6 is a flowchart illustrating a vehicle driving control method according to an embodiment of the present disclosure.

Referring to FIG. 6, the execution determination unit 110 may determine whether a motion sickness prevention mode is entered, based on road condition information and user-configured information about whether to activate the motion sickness prevention mode, while a vehicle is driving (S601).

When the execution determination unit 110 determines that the motion sickness prevention mode is entered (Yes in S601), the controller 120 may determine whether the vehicle accelerates or decelerates in a low-speed driving situation.

First, when a brake-pedal position sensor receives an input (Yes in S602), the controller 120 may determine that the vehicle decelerates, and may determine a deceleration demand torque corresponding to a sensing value of the brake-pedal position sensor. Then, the controller 120 may compare the determined deceleration demand torque with a predetermined reference torque (S603).

When the determined deceleration demand torque is less than the predetermined reference torque (Yes in S603), the controller 120 may control the vehicle to decelerate through a braking distribution ratio having a larger regenerative braking amount compared to the hydraulic braking amount (S604). However, when the determined deceleration demand torque exceeds the predetermined reference torque (No in S603), the controller 120 may determine that there is a driver's braking willingness and then release vehicle deceleration control by the controller 120 so that the control is not performed, and may output information about the release of the control so that the driver and a passenger are aware of the release of the control (S605).

Returning to step S604, when controlling the vehicle's deceleration through the braking distribution ratio having a larger regenerative braking amount compared to a hydraulic braking amount, the controller 120 may determine whether the vehicle's speed reaches a predetermined second reference speed (S606). When the vehicle's speed is equal to or lower than the predetermined second reference speed (Yes in S606), the controller 120 may determine, based on the road condition information, whether a road on which the vehicle is traveling is flat (S607).

When the road on which the vehicle is traveling is flat (Yes in S607), the controller 120 may control neutral N to be applied (S608). After neutral N is applied, the controller 120 may determine whether the vehicle's speed is equal to or lower than a predetermined third reference speed (S609). When the vehicle's speed is equal to or lower than the third reference speed (Yes in S609), the controller 120 may control the input of the brake-pedal position sensor to be released (S610). Due to the release of the brake-pedal position sensor's input, the vehicle's power is cut off, allowing the vehicle to decelerate on its own through coasting, and the controller 120 may determine whether the vehicle comes to a stop after deceleration (S611). When the vehicle comes to a stop (Yes in S611), the controller 120 may control an electronic parking brake to function, thereby controlling the vehicle to come to a complete stop (S612).

On the other hand, when the road on which the vehicle is traveling is not flat (No in S607), the controller 120 may generate a notification indicating that the control cannot be performed due to not meeting the flat road condition (S613). In response to the notification of the impossibility of performing the control, the driver can directly control the vehicle to slow down (S614). When the vehicle has slowed down to a stop (Yes in S615), the controller 120 may control the electronic parking brake (EPB) to be activated, thereby controlling the vehicle to come to a complete stop (S612).

When an accelerator-pedal position sensor receives an input (Yes in S616) in a low-speed driving situation of the vehicle, the controller 120 may determine that the vehicle accelerates, and may control longitudinal acceleration of the vehicle to be limited based on varied longitudinal limit acceleration (S617). The controller 120 may control the longitudinal acceleration of the vehicle to be limited until the vehicle's speed exceeds a predetermined first reference speed. When the vehicle's speed exceeds the first reference speed (Yes in S618), the controller 120 may end controlling the longitudinal acceleration of the vehicle to be limited.

According to the above description, the vehicle driving control method and the vehicle control device of the present disclosure may prevent a sudden change in longitudinal acceleration due to acceleration or deceleration of a vehicle by controlling the longitudinal acceleration to be limited when the vehicle accelerates, and by applying neutral N when the vehicle decelerates to a predetermined speed or lower.

Also, by preventing a sudden change in longitudinal acceleration, it is possible to prevent a driver and a passenger in the vehicle from experiencing motion sickness.

The present disclosure as described above may be implemented as codes in a computer-readable medium in which a program is recorded. The computer-readable medium includes all types of recording devices in which data readable by a computer system are stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like. Further, the above detailed description should not be construed in a limitative sense, but should be considered in an illustrative sense in all aspects. The scope of the present disclosure should not be determined by reasonable interpretation of the appended claims, and all changes and modifications within the equivalent scope of the present disclosure fall within the scope of the present disclosure.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

The invention claimed is:

1. A vehicle driving control method comprising:
determining whether a motion sickness prevention mode is entered, based on road condition information and user-configured information about whether to activate the motion sickness prevention mode, while a vehicle is driving; and
controlling, when the motion sickness prevention mode is entered, the vehicle by varying driving control factors, which comprises at least one of longitudinal limit acceleration, a hydraulic braking amount, a regenerative braking amount, a braking distribution ratio, and a shift gear configured for the vehicle, depending on whether the vehicle accelerates or decelerates in a low-speed driving situation where the vehicle's speed is equal to or lower than a predetermined first reference speed;
wherein the controlling comprises:
limiting longitudinal acceleration of the vehicle when the vehicle accelerates in the low-speed driving situation; and
when the vehicle decelerates, applying neutral N when the vehicle's speed reaches a predetermined second reference speed by performing the deceleration through a braking distribution ratio having a large regenerative braking amount compared to a hydraulic braking amount;
wherein applying the neutral N comprises determining, based on the road condition information, whether a road on which the vehicle is traveling is flat when the vehicle's speed reaches the predetermined second reference speed while the vehicle decelerates through the regenerative braking, and applying the neutral N when the road is determined to be flat;
wherein the method further comprises, after the controlling, controlling the input of the brake-pedal position sensor to be released when the neutral N is applied and the vehicle's speed decelerates to a predetermined third reference speed or lower, and activating an electronic parking brake when the input of the brake-pedal position sensor is released and the vehicle decelerates to a stop.

2. The vehicle driving control method of claim 1, wherein the controlling comprises limiting the longitudinal acceleration of the vehicle based on the longitudinal limit acceleration varied during acceleration in the low-speed driving situation when an accelerator-pedal position sensor receives an input.

3. The vehicle driving control method of claim 2, wherein the longitudinal limit acceleration is varied based on different acceleration change rates depending on at least one of a targeted degree of acceleration of the vehicle and a targeted degree of prevention of a user's motion sickness.

4. The vehicle driving control method of claim 2, wherein the controlling comprises limiting the longitudinal acceleration of the vehicle based on the longitudinal limit acceleration until the vehicle's speed exceeds the first reference speed in case that the vehicle accelerates in the low-speed driving situation.

5. The vehicle driving control method of claim 1, wherein the controlling comprises:

determining a deceleration demand torque corresponding to a sensing value of a brake-pedal position sensor when the brake-pedal position sensor receives an input in the low-speed driving situation; and applying the neutral N when the vehicle's speed reaches the predetermined second reference speed by performing deceleration through regenerative braking in case that the deceleration demand torque is less than a predetermined reference torque.

6. The vehicle driving control method of claim 1, wherein the controlling comprises controlling, when the vehicle decelerates in the low-speed driving situation, the vehicle to decelerate through the regenerative braking while following a preconfigured braking vehicle speed profile for reducing motion sickness.

7. The vehicle driving control method of claim 6, wherein the controlling of the vehicle to decelerate comprises controlling, when the vehicle decelerates in the low-speed driving situation, the vehicle to decelerate through the regenerative braking while following the braking vehicle speed profile in consideration of a preconfigured one of multiple regenerative braking detailed setting modes having different regenerative braking reduction amounts depending on vehicle speed.

8. A vehicle control device comprising:

an execution determination unit configured to determine whether a motion sickness prevention mode is entered, based on road condition information and user-configured information about whether to activate the motion sickness prevention mode, while a vehicle is driving; and a controller configured to control, when the motion sickness prevention mode is entered, the vehicle by varying driving control factors, which comprises at least one of longitudinal limit acceleration, a hydraulic braking amount, a regenerative braking amount, a braking distribution ratio, and a shift gear configured for the vehicle, depending on whether the vehicle accelerates or decelerates in a low-speed driving situation where the vehicle's speed is equal to or lower than a predetermined first reference speed;

wherein the controller is configured to:

limit longitudinal acceleration of the vehicle when the vehicle accelerates in the low-speed driving situation;

apply, in case that the vehicle decelerates, neutral N when the vehicle's speed reaches a predetermined second reference speed by performing the deceleration through a braking distribution ratio having a large regenerative braking amount compared to a hydraulic braking amount;

determine, based on the road condition information, whether a road on which the vehicle is traveling is flat when the vehicle's speed reaches the predetermined second reference speed while the vehicle decelerates through the regenerative braking, and apply the neutral N when the road is determined to be flat;

control the input of the brake-pedal position sensor to be released when the neutral N is applied and the vehicle's speed decelerates to a predetermined third reference speed or lower; and activate an electronic parking brake when the input of the brake-pedal position sensor is released and the vehicle decelerates to a stop.

9. The vehicle control device of claim 8, wherein the controller is configured to limit the longitudinal acceleration of the vehicle based on the longitudinal limit acceleration varied during acceleration in the low-speed driving situation in case that an accelerator-pedal position sensor receives an input.

10. The vehicle control device of claim 9, wherein the longitudinal limit acceleration is varied based on different acceleration change rates depending on at least one of a targeted degree of acceleration of the vehicle and a targeted degree of prevention of a user's motion sickness.

11. The vehicle control device of claim 9, wherein the controller is configured to limit the longitudinal acceleration of the vehicle based on the varied longitudinal limit acceleration until the vehicle's speed exceeds the first reference speed in case that the vehicle accelerates in the low-speed driving situation.

12. The vehicle control device of claim 8, wherein the controller is configured to:

determine a deceleration demand torque corresponding to a sensing value of a brake-pedal position sensor in case that the brake-pedal position sensor receives an input in the low-speed driving situation; and apply the neutral N when the vehicle's speed reaches the predetermined second reference speed by performing deceleration through regenerative braking in case that the deceleration demand torque is less than a predetermined reference torque.

13. The vehicle control device of claim 8, wherein the controller is configured to, when the vehicle decelerates in the low-speed driving situation, control the vehicle to decelerate through the regenerative braking while following a preconfigured braking vehicle speed profile for reducing motion sickness.

14. The vehicle control device of claim 13, wherein the controller is configured to, when the vehicle decelerates in the low-speed driving situation, control the vehicle to decelerate through the regenerative braking while following the braking vehicle speed profile in consideration of a preconfigured one of multiple regenerative braking detailed setting modes having different regenerative braking reduction amounts depending on vehicle speed.

* * * * *